United States Patent [19]

Morelli et al.

[11] Patent Number: 5,229,907
[45] Date of Patent: Jul. 20, 1993

[54] DEVICE FOR PROTECTION AGAINST OVERVOLTAGES OF INTEGRATED ELECTRONIC CIRCUITS, PARTICULARLY FOR APPLICATIONS IN THE MOTOR CAR FIELD

[75] Inventors: Marco Morelli, Leghorn; Fabio Marchio, Gallarate; Bruno Cavalli, Calolziocorte, all of Italy

[73] Assignee: SGS-Thomson Microelectronics, s.r.l., Agrate Brianza, Italy

[21] Appl. No.: 536,886

[22] Filed: Jun. 13, 1990

[30] Foreign Application Priority Data

Jun. 15, 1989 [IT] Italy ................... 20885 A/89

[51] Int. Cl.⁵ .............................................. H02H 9/00
[52] U.S. Cl. ........................................ 361/56; 361/91
[58] Field of Search ............... 361/56, 91, 111, 89, 361/33, 58; 323/231

[56] References Cited

U.S. PATENT DOCUMENTS

| | | | |
|---|---|---|---|
| 3,921,005 | 11/1975 | Watrous | 307/64 |
| 3,970,900 | 7/1976 | Hodgins | 317/31 |
| 4,005,342 | 1/1977 | Davis | 317/16 |
| 4,322,770 | 3/1982 | Sendelweck | 361/91 |
| 4,571,656 | 2/1986 | Ruckman | 361/56 |
| 4,589,049 | 5/1986 | Krumrein | 361/56 |
| 4,774,620 | 9/1988 | Enomoto et al. | 361/91 |
| 4,775,912 | 10/1988 | Menniti et al. | 361/56 |
| 4,870,528 | 9/1989 | Harford | 361/56 |
| 4,949,212 | 8/1990 | Lenz et al. | 361/56 |

FOREIGN PATENT DOCUMENTS

| | | | |
|---|---|---|---|
| 3310242 | 9/1984 | Fed. Rep. of Germany | 361/56 |
| 2512598 | 9/1981 | France | 361/56 |

OTHER PUBLICATIONS

European Search Report No. EP 90 20 1475 date Sep. 19, 1990.

*Primary Examiner*—Steven L. Stephan
*Assistant Examiner*—Matthew Nguyen
*Attorney, Agent, or Firm*—Sixbey, Friedman, Leedom & Ferguson

[57] ABSTRACT

The device for protection comprises a zener diode voltage limiter having a breakdown voltage pre-set at a value (say, 30 volts) lower than the maximum value sustainable by the protected circuit in the closed condition and a quenching circuit having a pre-set lag controlled by each overvoltage impulse and suitable for disactivating said voltage limiter and to control the opening of said protected circuit with a time lag pre-set with respect to the start of each overvoltage impulse. In succession to said voltage limiter there is introduced in addition a zener diode with a higher breakdown voltage, say, equal to 110 volts, which allows the limitation to such a value of any overvoltages having a very low energy content superimposed over overvoltages having limited amplitude and long duration.

4 Claims, 3 Drawing Sheets

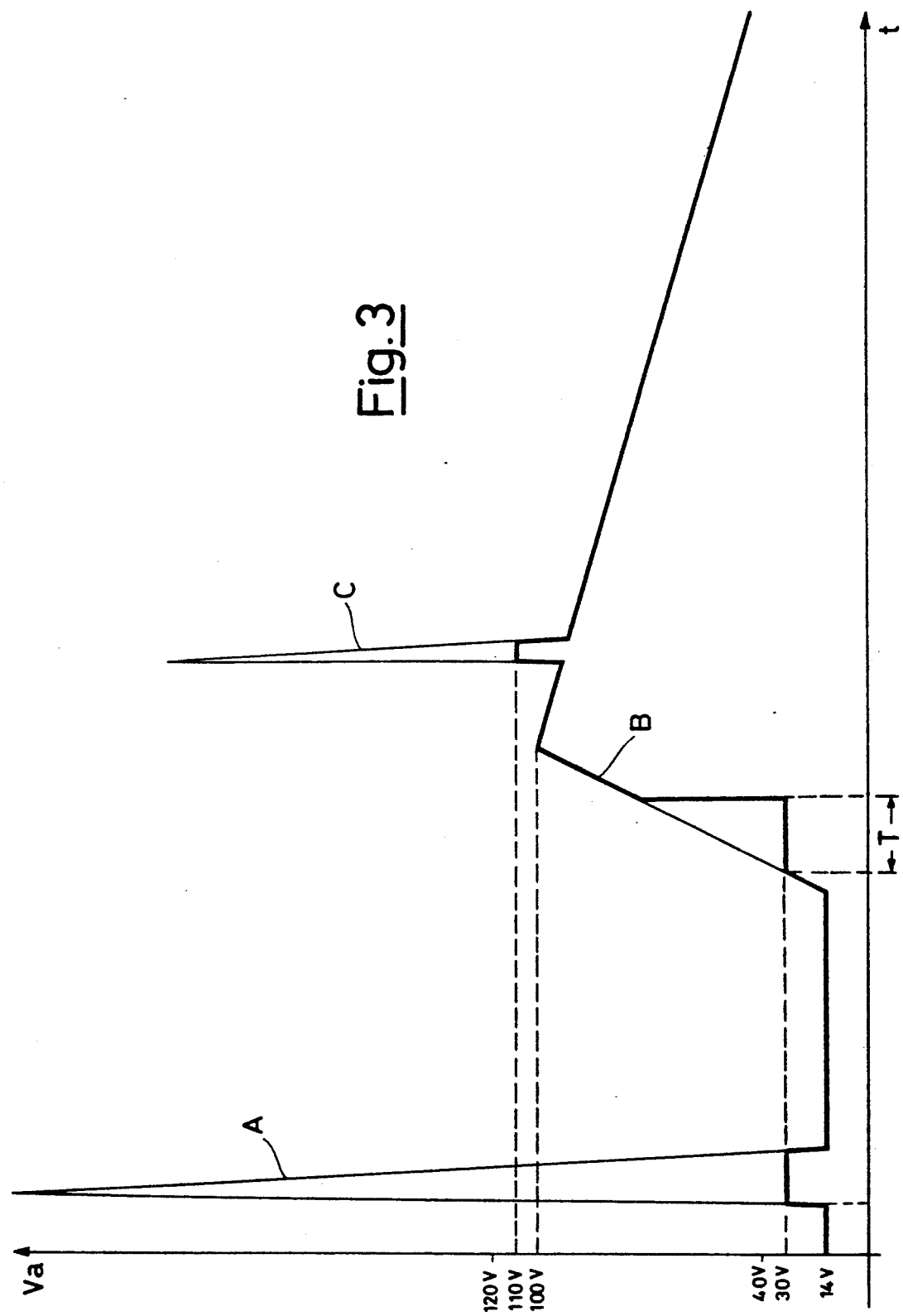

DEVICE FOR PROTECTION AGAINST OVERVOLTAGES OF INTEGRATED ELECTRONIC CIRCUITS, PARTICULARLY FOR APPLICATIONS IN THE MOTOR CAR FIELD

DESCRIPTION

The present invention relates to a device for protection against overvoltages of integrated electronic circuits, suitable in particular for applications in the motor car field.

One of the main problems of electronic circuits used in the motor car field is the presence, on the power supply line, of overvoltages having a high amplitude (up to 300 volts). In fact, bipolar electronic circuits can sustain a high voltage when they are open, while overvoltages become extremely dangerous for the electronic circuits themselves when they are closed.

The more usual known art of protection provides for the use of a zener diode, at the input to the circuit, whose size is selected so as to ensure the dissipation of the energy present in each of the impulses which may be present on the power supply. These impulses have different amplitudes and different energy content. In practice, they can be divided into two categories:

Impulses having short duration and a high voltage (Vmax=300 volts, Tmax=1 ms).

Impulses having long duration and a medium voltage (Vmax=100 volts, Tmax=300 ms).

The most demanding condition from an energy viewpoint is that related to the impulses having a longer duration for which it is necessary to use a zener (say, having a breakdown voltage of some 30 volts) of a sufficiently large size to absorb a substantial amount of energy. A diode of such size can not, on the other hand, be inserted in an integrated circuit.

The object of the present invention is to accomplish a device for protection of integrated electronic circuits, which may be accomplished in an integrated technology, and allows the limitation to values which may be sustained by the integrated technology of impulses having a short duration and a high amplitude, without having to dissipate the energy possessed by long-duration impulses.

According to the invention such object is attained by means of a device for protection against overvoltages of electronic circuits, particularly for applications in the motor car field, characterized in that it comprises a zener diode voltage limiter having a breakdown voltage pre-set at a value lower than the maximum value sustainable by the protected circuit in the closed condition and a quenching circuit having a pre-set lag controlled by each overvoltage impulse and suitable for disactivating said voltage limiter and to control the opening of said protected circuit with a time lag pre-set with respect to the start of each overvoltage impulse.

Advantageously it is possible to introduce, in succession to said voltage limiter, a zener diode having a very high breakdown voltage, say, equal to 110 volts, which allows the limitation to such value of any overvoltages having a very low energy content.

These and other features of the present invention shall be made more evident by the following detailed description of an embodiment, illustrated as a non-limiting example in the enclosed drawings, wherein:

FIG. 3 shows the curve against time of a generic voltage signal at the input to the electronic circuit to be protected, with and without the use of the device for protection.

Figure 1:
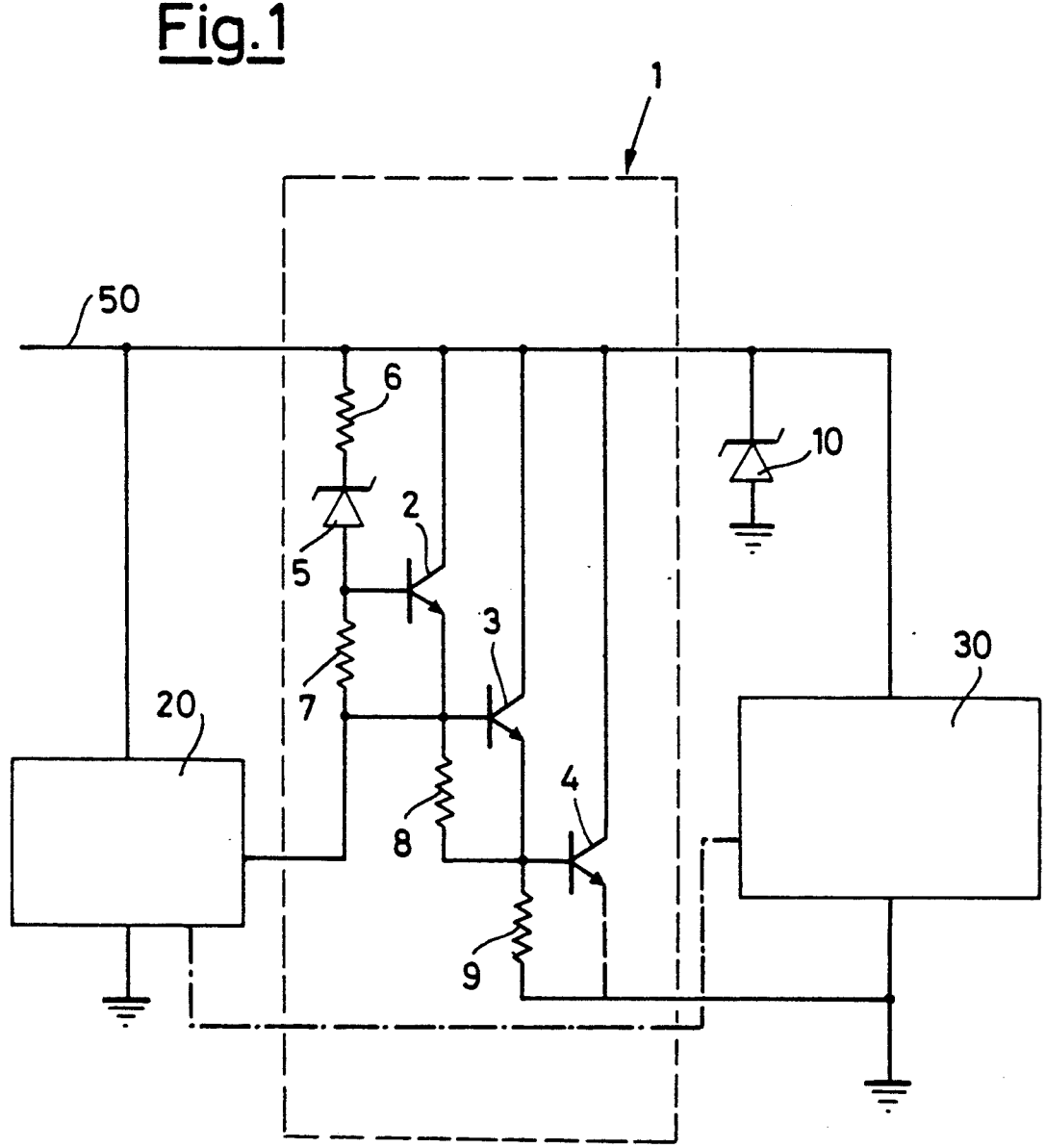
FIG. 1 shows a device for protection according to the invention.

With reference to FIG. 1, the device for protection according to the invention comprises a zener diode voltage limiter, associated with a voltage supply line 50 for an integrated circuit to be protected and indicated as a whole with 1. Said limiter comprises a group of three transistors 2, 3, 4, connected in cascade with the respective collectors connected to the power supply line 50. In particular, transistor 2 has the base, on one side, connected to the power supply line through the series of a zener diode 5, having a breakdown voltage (say, equal to 30 volts) which is lower than the maximum voltage (say, 40 volts) which may be sustained by the integrated circuit 30 in the closed position, and a resistor 6, on the other connected to the respective emitter through a resistor 7. Transistor 3 has the base, on one side, connected to the emitter of transistor 2, on the other connected to the respective emitter through resistor 8. Transistor 4 has the base, on one side, connected to the emitter of transistor 3, on the other connected to the respective emitter through resistor 9. The emitter of transistor 3 is grounded.

In parallel with said voltage limiter 1, at the input to the integrated circuit 30, there is connected a zener diode 10 having a breakdown voltage (say, equal to 110 volts) which is lower than the maximum voltage (say, 120 volts) which may be sustained by the integrated circuit 30 in the open condition.

Figure 2:
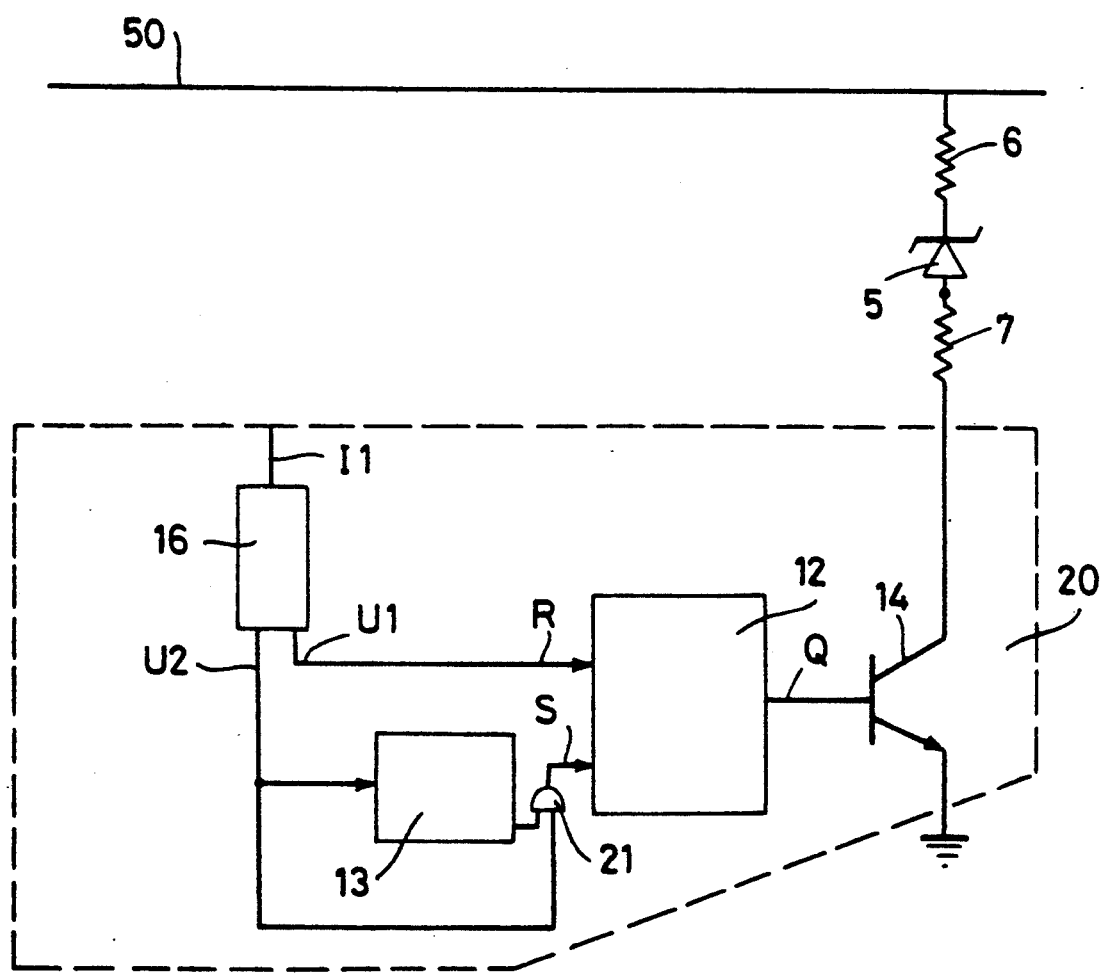
FIG. 2 shows in detail the quenching circuit having a pre-set lag which is included in said device for protection.

At the input to said voltage limiter 1 there is a quenching circuit 20 having a pre-set lag T. As shown in detail in FIG. 2 said circuit 20 comprises a threshold circuit 16, say, a zener having the same breakdown voltage as zener 5, with the input I1 connected to the power supply line 50, and a group of two outputs U1, U2, indicating the overshooting of the threshold and the subsequent return below the threshold itself, respectively. In particular U1 reaches one of the two inputs directly, respectively R, of a two-position switch 12, say, a flip-flop, U2 reaches a lag circuit 13 having a pre-set time T, say, a monostable multivibrator, whose output, combined with the same output U2 of a logic gate AND 21, reaches an input, S, to said switch 12. The output Q of said switch 12 is connected to the base of a transistor 14 whose emitter is connected to ground and whose collector reaches said voltage limiter 1 at the base of transistor 3 and said electronic circuit 30 to be protected, respectively.

The operation of the device for protection according to the invention varies in relation to the characteristics of the voltage peaks on the power supply line 50.

In this respect any overvoltages may have two different configurations. As illustrated in FIG. 3 which represents the variation of voltage Va on the line 50 against time t it is possible to have voltage peaks having a high amplitude and a short duration, having a duration lower than the above lag time T, say, equal to about 1 ms, as for peak A, and there may also be peaks having a lesser amplitude and a higher duration, as for peak B.

Supposing that on the power supply line there is present a voltage peak of the A type, the voltage peak A passes inside the voltage limiter block 1 and is therein limited in amplitude. This occurs due to the fact that, when the power supply voltage exceeds the breakdown voltage of zener 5, zener 5 starts to conduct and thus biases in conduction transistors 2, 3, 4 which discharge to ground the voltage exceeding 30 volts. This situation persists until the power supply voltage does not go back to below the breakdown voltage of zener 5. Simultaneously with the overshooting of the pre-set voltage threshold, there is activated the quenching circuit having a pre-set Lag T, but since the duration of peak A is less than the Lag time T, said circuit does not operate to disactivate block 1.

Supposing on the other hand that there is present on the power supply line a voltage peak of the B type, when the pre-set voltage threshold is overshot not only is zener 5 triggered, which limits the voltage to the value pre-set as previously described for peak A, but the longer duration of peak B also causes the intervention of the quenching circuit 20 which, having the pre-set Lag time T, quenches zener 5 and as a consequence the three transistors 2, 3, 4.

At the same time, said quenching circuit 20 opens the electronic circuit 30 to be protected which, under such condition, is in a position of sustaining much higher voltages than when it is in the closed position.

The quenching of zener 5 causes the voltage limiting effect of block 1 to cease, so that the voltage on line 50 once again starts to rise according to peak B, attaining at most a value of 100 volts which would be harmful for circuit 30 when closed, but is not so when circuit 30 is open.

Supposing that in the meantime there is also present a further voltage peak C having a high amplitude and a very short duration, superimposed over said voltage peak B, there intevenes zener diode 10, having a breakdown voltage of 110 volts, which is situated immediately at the input to the integrated circuit to be protected and limits the amplitude of said peak C to a value which can be tolerated by the open electronic circuit.

We claim:

1. An overvoltage protecting device for an integrated electronic circuit fed with a voltage supply particularly for motor car applications, comprising:
    first protecting means for protecting said integrated electronic circuit against a first type of overvoltages of comparatively high voltage value and short duration, including a zener diode voltage limiter having a breakdown voltage lower than a maximum voltage value sustainable by the integrated circuit in closed condition, said zener diode voltage limiter operating to protect said integrated electronic circuit in a first mode of operation of the device occurring in response to said first type of overvoltage; and
    second protecting means for protecting said integrated electronic circuit against a second type of overvoltages with voltage higher than said zener breakdown voltage and a duration longer than a predetermined time, said second protection means including a quenching circuit selectively controlled by said voltage supply in a second mode of operation of the device to deactivate said zener diode voltage limiter and open the integrated circuit in case of an overvoltage higher than said zener breakdown voltage and having a duration greater than a pre-fixed time.

2. A device according to claim 1, wherein said voltage limiter comprises a zener diode having a breakdown voltage lower than said maximum voltage value and a cascade of transistors controlled by said zener diode.

3. A device according to claim 1, wherein in parallel with said voltage limiter, at the input to the electronic circuit, there is connected a zener diode having a breakdown voltage lower than a maximum voltage sustainable by the integrated circuit in the open condition.

4. An overvoltage protecting device for an integrated electronic circuit fed with a voltage supply particularly for motor car applications, comprising a zener diode voltage limiter having a breakdown voltage lower than a maximum voltage value sustainable by the integrated circuit in closed condition and a quenching circuit controlled by said voltage supply to deactivate said voltage limiter and open the integrated circuit in case of an overvoltage having a duration greater than a pre-fixed time;
    wherein said quenching circuit comprises a threshold circuit suitable for generating respective first and second outputs when said overvoltage overshoots a pre-set threshold and when it returns below it, respectively, and switch means controlled by said first output to deactivate said voltage limiter and open the integrated circuit if said first output continues beyond said pre-fixed time and further controlled by said second output to reactivate said voltage limiter and reclose the integrated circuit at the termination of the overvoltage condition.

* * * * *